United States Patent [19]

Smith et al.

[11] Patent Number: 4,700,897

[45] Date of Patent: Oct. 20, 1987

[54] LONG REACH DROPPED WHEEL-LINE IRRIGATION SYSTEM

[76] Inventors: Alvin D. Smith; Darin E. Smith, both of HC 79, Box 2175; Reed R. Smith, HC 79, Box 2160, all of Oreana, Id.

[21] Appl. No.: 885,177

[22] Filed: Jul. 14, 1986

[51] Int. Cl.⁴ .................. A01G 25/09; B05B 3/04; B05B 3/18; B05B 15/06
[52] U.S. Cl. .................................. 239/741; 239/273
[58] Field of Search ............... 239/273, 275, 726, 734, 239/735, 737, 741, 723

[56] References Cited

U.S. PATENT DOCUMENTS

| | | | |
|---|---|---|---|
| 3,002,697 | 10/1961 | Jones | 239/741 |
| 3,045,922 | 7/1962 | Jensen | 239/741 |
| 3,807,638 | 4/1974 | Clements | 239/741 X |

*Primary Examiner*—Andres Kashnikow
*Assistant Examiner*—Mary Beth O. Jones
*Attorney, Agent, or Firm*—Paul F. Horton

[57] ABSTRACT

A wheel line irrigation system provided with a plurality of rotary, impact-type, high volume sprinklers, each of the sprinklers provided with a nozzle having a large discharge port of 0.5 inches in diameter or greater. The pipeline is axially affixed to laterally spaced wheels; the pipeline including a main line, having a substantially horizontal longitudinal axis, and a plurality of dropped line portions, of modified V-shape, to which each respective sprinkler is attached. The inlet port of each nozzle is located at or below the longitudinal axis of the main line and preferably in a vertical plane with the main line to overcome the reactive thrust of the sprinkler and to reduce the oscillation, caused by the impact arm, of each sprinkler. Each of the dropped pipeline sections may be provided with a downwardly depending pedestal, with foot for engaging the ground, once the pipeline is filled with irrigation water, to support the pipeline and to dissipate the energy of the impact arm to ground to prevent oscillation of the pipeline.

10 Claims, 3 Drawing Figures

LONG REACH DROPPED WHEEL-LINE IRRIGATION SYSTEM

BACKGROUND OF THE INVENTION

1. Field of the Invention

This invention relates to wheel line irrigation systems and particularly to such systems which utilize high volume impact type sprinklers.

2. Description of the Prior Art

Wheel line irrigation systems are well known in the art and are widely used in arid parts of the country for sprinkler irrigation of large areas. A conventional wheel line system includes a series of laterally spaced wheels which carry an irrigation pipeline, on the top of which are mounted a series of sprinklers; each sprinkler operable to cover a circular area of 60 feet in diameter, or an area of approximately 2,826 square feet. The sprinklers are placed 40 feet apart for overlap. The wheel line may be manually moved or self propelled.

Also in the art is a sprinkler of high volume and long reach known under the registered trademark as BIG GUN ®. Such a sprinkler is of the rotary, arm-impact type having a nozzle discharge port of from 0.5" to 0.9". Because of the water demand for such a sprinkler; the torque placed on the pipeline by reactive thrust; and oscillations due to the impact of the high pressure, high volume stream on the impact arm, the sprinkler is presently located only at the terminal outlet end of a conventional sprinkler system, closely adjacent to a support wheel. Mounting of such a sprinkler elsewhere on the pipeline causes destruction of the line because of the effect of the torque and oscillation on the line. The BIG GUN ® type of sprinkler covers a circular area of 250 feet in diameter, or an area of approximately 49,000 square feet—some 17 times the area of conventional sprinklers. The desirability of having a system utilizing such a sprinkler along the length of the pipeline is therefor obvious.

SUMMARY OF THE INVENTION

The present invention overcomes the problems of line weight; torque; and oscillation, by providing a wheel line irrigation system which provides dropped line portions of the pipeline onto which sprinklers of the rotary impact type, having a discharge nozzle port of 0.5" or greater, are mounted. The dropped line portions permit water discharge so that the thrust of the discharge is at or below and preferably in alignment with the longitudinal axis of adjacent pipeline. The dropped line portion is provided with a pedestal for supporting the line and for absorbing the jar of the impact arm to prevent oscillation. A more thorough and comprehensive description of the apparatus may be found in the appended claims.

It is therefor a general object of the present invention to provide a wheel line irrigation system utilizing rotary impact-type sprinklers having a nozzle discharge port of 0.5" or greater for vastly improved coverage.

More particularly, it is an object of the present invention to provide a wheel line irrigation system utilizing rotary impact-type sprinklers having a nozzle discharge port of 0.5" or greater by providing dropped portions of the line which are immovably secured to the main line for mounting of the sprinklers at or below the longitudinal axis of the main line to reduce torque on the line from the reactive thrust of the discharged water.

Another object of the present invention is to provide a pedestal under the dropped portion of the pipeline for support of the line when the line is filled with water and for transmitting energy generated by the impact arm of the sprinkler to ground to prevent oscillation of the pipeline.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
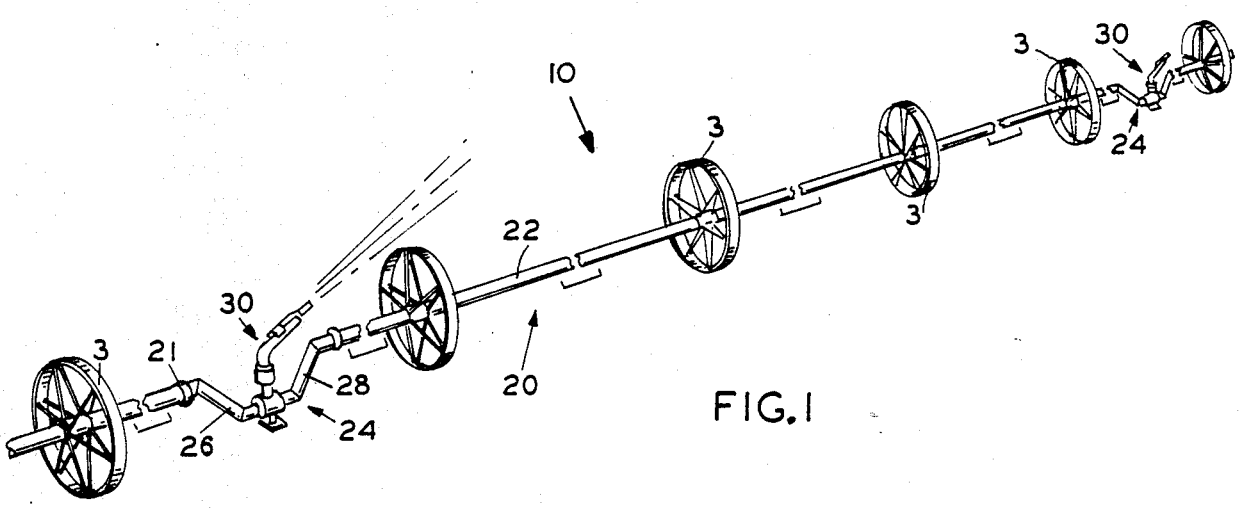
FIG. 1 is a perspective view of the wheel line irrigation system of the present invention.
Figure 2:
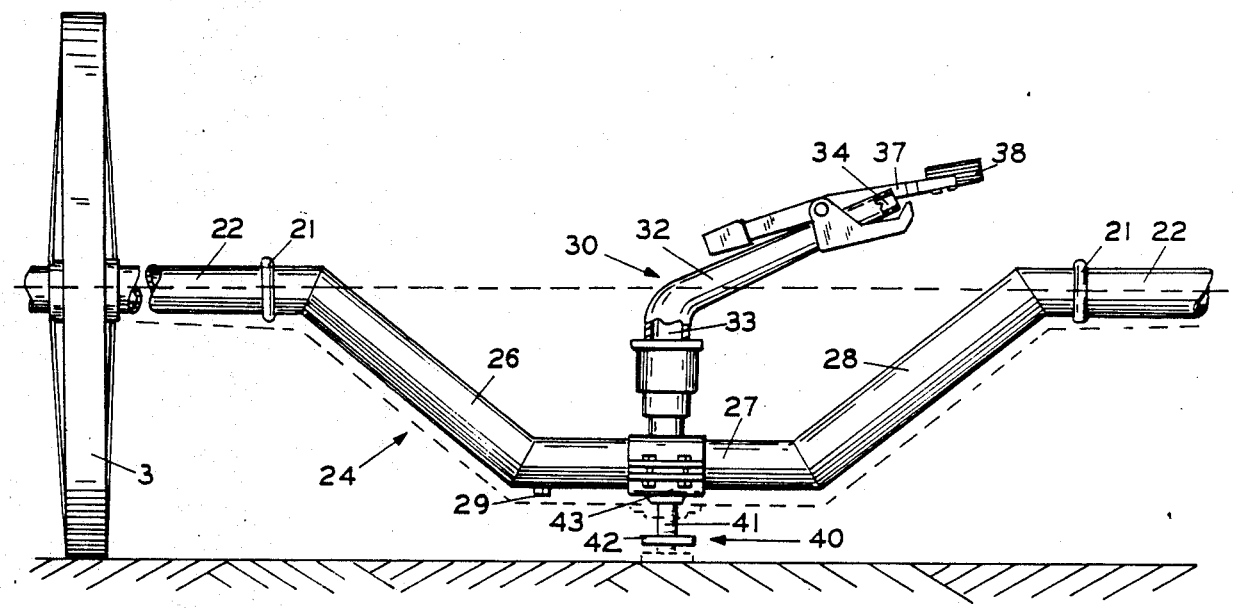
FIG. 2 is a side elevation of a dropped portion of the pipeline, showing the location of the sprinkler nozzle relative to the longitudinal axis of the main line, illustrated by a dotted line.

Referring now to the drawings, and, more particularly, to FIGS. 1 and 2, an embodiment to be preferred of a wheel line irrigation system 10 made according to the present invention is disclosed. System 10 includes a plurality of laterally spaced wheels 3; an elongated pipeline 20, carried by the wheels; and a plurality of sprinklers 30, mounted on the pipeline.

Wheels 3 are conventional in the art and are preferably of the spoked, steel rim, type having a diameter of five feet. The wheels are laterally spaced approximately forty feet apart. Secured to the wheels, at the axes of the wheels, so as to be rotatable therewith is pipeline 20. The pipeline is preferably constructed of aluminum and is from four to six inches in diameter. It is contemplated that smaller diameter pipe could be used with the inclusion of valves, not shown, for restricting the flow of water to selected sprinklers.

Pipeline 20 includes a main line, designated generally by the numeral 22 and a plurality of dropped lines, designated by the numeral 24. The dropped lines are spaced at selected intervals along the length of the main line, preferably one hundred fifty feet apart. The dropped lines, as the name indicates, are located below the main line and are preferably aligned and in a vertical plane therewith. The dropped lines may be constructed to include a horizontal conduit 27, approximately one foot below and parallel with the main line and a pair of oppositely disposed diverging elbow conduits 26 and 28, affixed to the horizontal conduit and either end thereof and affixed to adjacent portions of the main line so as to be in fluid communication therewith. Couplings 21 may be used to secure the dropped lines 24 to the main line 22. The angle of divergence of the elbows and the length of conduit 27 must be such that there may be unobstructed 360 rotation of sprinkler 30. Horizontal conduit 27 is provided with an automatic drain plug 29 for draining the system.

Mounted to each dropped line 24, and downwardly depending therefrom, is a pedestal 40. Pedestal 40 includes a standard 41 and a foot member 42 for engaging the ground, once the pipeline is filled with water. The pedestal is short enough so as to not touch the ground when the pipeline is empty. This is to allow rotation of the wheels with attached pipeline for moving the system from one sprinkling location to another without contact between the pedestal and the ground. The pedestal may be attached to the dropped line by means of bracket 43 or by other conventional means.

Sprinklers 30 are of the rotary, impact type, having a single primary nozzle which discharges water in one direction only at any particular time. Such a sprinkler is currently marketed under the trademark, BIG GUN ®. Each sprinkler includes a nozzle 32 having an inlet port 33 and a discharge port 34 and also includes an impact arm 37 with a drive spoon 38 for engaging the high pressure stream of water exiting from the discharge port of the nozzle, for rotation of the nozzle. Sprinkler 30 is mounted by any suitable connection to the top surface of horizontal conduit 27 of dropped line 24. It is an important part of the invention that the inlet port 33 of the nozzle be at or below the longitudinal axis of the adjacent main line 22 to which the dropped line 24 and hence the sprinkler is attached, as shown in FIG. 2; the axis of the main line being represented by the dotted line. This, for the reason that the reactive thrust of the water being discharged through the discharge port of the nozzle, being of high volume and under a pressure of 40 to 100 psi at the discharge port, places a torque on the dropped line, dependent upon the distance of the structural point of greatest reactive thrust, ie., adjacent the inlet port 33 of the nozzle, from the axis of the main line. Since the dropped line 24 is in a vertical plane with the main line and the sprinkler is vertically mounted on the top of the dropped line, the inlet port of the nozzle is at the approximate axis of the mainline. It is to be noted that since the sprinkler has only a single primary nozzle, it is important that the dropped line be immovably secured to the main line and the main line, in turn, immovably secured to the wheels. For proper irrigation over such a large area, the discharge port 34 of the nozzle of each sprinkler should be at least 0.5" in diameter.

Figure 3:
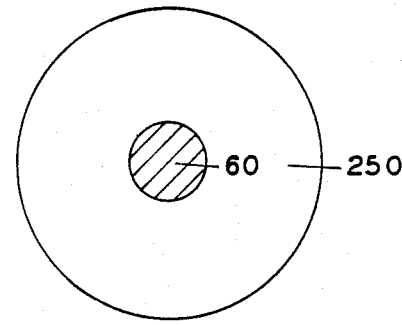
FIG. 3 shows the area of coverage of a conventional irrigation sprinkler as compared to the high volume sprinkler utilized in the present invention.

To give some perspective to the area of coverage of the large nozzle sprinklers utilized in the present invention, operating at the pressures above indicated, as compared to a conventional sprinkler, attention is directed to FIG. 3. The inner circle, with cross-hatching, and identified by the numeral 60, represents the diameter and area of the circular coverage by a conventional sprinkler, i.e. approximately 60 feet in diameter and covering approximately 2,326 square feet. The large outer circle, represented by the numeral 250, represents the diameter and area of the area covered by the sprinkler used in the present invention, i.e., approximately 250 feet in diameter and an area of approximately 49,000 square feet.

For operation, the wheel line irrigation system 10 of the present invention is first located at an area desired to be irrigated. The wheels are placed at such a position that the pedestals 40 and sprinklers 30 are all in a vertical position. Valves, if present, are then manipulated to control the sprinklers to be operated. In the system described, and in a system actually used, the pipeline is 1320', i.e. one-quarter mile, in length, with the wheels be spaced at forty foot intervals and the sprinklers, mounted on the dropped lines, at 150' intervals for sufficient overlap. The pipeline used and described was of aluminum, having a diameter of 5". Once in place, irrigation water is turned into the pipeline; the weight of the water causing a flexing of the aluminum pipeline and causing the support pedestals 40 to engage the ground by means of foot members 42. As water is forced through each sprinkler 30, the torque produced by the reactive thrust of the discharging water is held to a minimum because the inlet port of the nozzle, the point of nozzle angulation from its vertical mount, is at the approximate axis of the main line. The sprinklers are free to rotate without obstruction and the sprinklers, being spaced from the wheels 3, project a stream of water which is unimpeded by close structural elements such as wheels or pipeline. The impact arms 37, driven by the water discharge, which would ordinarily cause severe oscillation of the pipeline, has its energy sufficiently dissipated and dampened by the proximate pedestal's contact with the ground so that oscillation is no longer a problem. The pedestals also provide desired support to insure the structural integrity of the pipeline. Once the irrigation is completed, the wheel line system 10 is drained and moved to a new area either manually or by drive means, not shown. In moving the system, it will be noted that both the sprinklers and the oppositely disposed pedestals rotate with the pipeline, neither coming into contact with the ground because of the recessed placement of the sprinklers in the dropped lines and because of the short height of the pedestals which depend upon the weight of the water in the pipeline for contact with the earth. When irrigation is completed for the set, drain plugs 29 are automatically opened and the dropped lines drained to aid in moving to a new location.

Having thus described in detail a preferred embodiment of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. Wheel line irrigation apparatus comprising:
    a plurality of laterally spaced wheels;
    an elongated pipeline, for supplying irrigation water, suspended by and between said wheels, said pipeline defining a main line, having a substantially horizontal longitudinal axis, and a plurality of dropped lines, having longitudinal axes, located at selected intervals along the length of and below said main line, each of said dropped lines including a pair of divergent elbow conduits and a horizontal conduit therebetween, each of said elbow conduits connected to an adjacent main line; and
    a plurality of rotatable sprinklers, each of said sprinklers mounted on the top surface of said horizontal conduit of a respective dropped line.

2. The apparatus as described in claim 1 wherein each of said sprinklers includes at least one nozzle, each nozzle having an inlet port and a discharge port, the inlet port of each nozzle being located at or below the horizontal longitudinal axis of the main line to reduce torque on said pipeline.

3. The apparatus as described in claim 2 wherein the longitudinal axis of each of said dropped lines is in a vertical plane with the longitudinal axis of the main line.

4. The apparatus as described in claim 2 wherein the discharge port of each of said nozzles is at least 0.5 inches in diameter.

5. The apparatus as described in claim 1 wherein the height of each of said sprinklers mounted on each of said dropped lines is less than the height of each of said wheels for clearing the ground upon rotation of said wheels.

6. The apparatus as described in claim 1, wherein said wheels are immovably secured to said pipeline for rotation therewith.

7. The apparatus as described in claim 1 further comprising a plurality of pedestals, each of said pedestals downwardly depending from a respective one of said dropped lines for supporting said respective dropped line when filled with water.

8. The apparatus as described in claim 7 wherein each of said pedestals is of such height so as to clear the ground when said dropped lines are free of water and wherein each of said sprinklers is of such height so as to clear the ground when inverted so that said pipeline and said wheels may be rotated without said pedestals or said sprinklers engaging the ground.

9. Wheel line irrigation apparatus comprising:
a plurality of laterally spaced wheels;
an elongated pipeline suspended by and between said wheels, said pipeline defining a main line, having a substantially horizontal longitudinal axis, and a plurality of dropped lines located between and in fluid communication with adjacent portions of said main line to which they are attached; and
a plurality of sprinklers, each of said sprinklers mounted on the top of a respective one of said dropped lines, each of the sprinklers being of the impact type for rotation and each of the sprinklers having a single primary nozzle having an inlet port and a discharge port, said discharge port being at least 0.5 inches in diameter and said inlet port of each of said nozzles being located at or below the longitudinal axis of adjacent main line portions of said pipeline to which each of said dropped lines are affixed for reducing torque on said pipeline; and
a plurality of pedestals downwardly depending from a respective one of said dropped lines for supporting said respective dropped line when said dropped line is filled with water and for transmitting impact energy from each of said sprinklers to ground for reducing oscillation of said pipeline.

10. The apparatus as described in claim 9 wherein each of said dropped lines is provided with drainage means.

* * * * *